United States Patent
Rashkovskiy et al.

(10) Patent No.: US 6,252,577 B1
(45) Date of Patent: Jun. 26, 2001

(54) EFFICIENT METHODOLOGY FOR SCALING AND TRANSFERRING IMAGES

(75) Inventors: Oleg Rashkovskiy, Cupertino, CA (US); Ajaya Durg, Hillsboro, OR (US); William W. Macy, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/272,653

(22) Filed: Mar. 18, 1999

(51) Int. Cl.[7] .................................................... G09G 5/00
(52) U.S. Cl. ............................ 345/127; 358/428; 382/300
(58) Field of Search .................................... 382/300, 291, 382/167, 162; 358/428, 525; 345/132, 127, 439, 138, 150, 153; 348/441

(56) References Cited

U.S. PATENT DOCUMENTS

| | | | |
|---|---|---|---|
| 5,574,572 | * 11/1996 | Malinowski et al. | 358/451 |
| 5,793,379 | * 8/1998 | Lapidous | 345/439 |
| 5,859,651 | * 1/1999 | Potu | 345/526 |
| 5,889,554 | * 3/1999 | Muntze | 348/273 |
| 5,937,112 | * 8/1999 | Herregods et al. | 382/319 |
| 6,075,886 | * 5/2000 | De Queiroz | 382/164 |

* cited by examiner

Primary Examiner—Bipin Shalwala
Assistant Examiner—Nitin Patel
(74) Attorney, Agent, or Firm—Blakely, Sokoloff, Taylor & Zafman LLP

(57) ABSTRACT

In an embodiment of the invention, a method of downscaling an original image by generating a number of pixels comprising first, second, and third sets. Each pixel comprises a number of components. The method operates by determining all of the components in each pixel of the first set, determining some of the components in each pixel of the second set, and pixels in the third set having no components determined. The scaled image is thus partially determined, with the second and third sets having missing components. The missing components may then be determined by conventional interpolation. Mathematical operators are applied to regions of the image to yield the first, second and third sets of pixels that define the scaled image, without generating an intermediate image in which all three components are determined. The operators may combine interpolation and low pass filtering using a Hamming filter. In certain system applications such as the digital camera, components in the first set and the second set are determined by the digital camera and then transferred to a data processing system (e.g. a personal computer) before the missing components of the second and third sets are determined.

25 Claims, 3 Drawing Sheets

EFFICIENT METHODOLOGY FOR SCALING AND TRANSFERRING IMAGES

FIELD OF THE INVENTION

This invention is generally related to digital image processing, and more particularly to techniques for efficiently downscaling images and for transferring images from an imaging device to a processing system.

BACKGROUND

Digital still photography and video are becoming increasingly popular applications of personal computers (PCs). A digital camera can be used to generate an image that electronically captures a scene. The image may then be immediately transferred to the PC for further processing and viewing.

The digital camera contains an integrated circuit image sensor that records the scene as an image being an array of data values called pixels (picture elements). To record a scene in color, the image sensor is covered with an array of color filters so that each pixel represents the detected intensity of a particular color in light that is incident upon a corresponding circuit element of the image sensor. An important processing step performed in digital cameras as well as many other imaging devices is downscaling an original image obtained by the image sensor into a smaller size having fewer pixels. Downscaling is also used in digital cameras to allow faster transfer of the downscaled version of the image to the PC, because the downscaled version defines a smaller data set than the original image. Downscaling is also used to improve the performance of video applications where a large number of images must be transferred to the PC in a short period of time. In addition, downscaling lowers the cost of the digital camera by allowing reduced storage requirements for each image.

Conventional techniques for downscaling typically involve three steps. First, each pixel in the original image is converted from having a single color component into one pixel having multiple color components. Doing so more accurately depicts the true color of the scene that has been captured. This is normally done by interpolating the additional color components of a pixel based on the intensities and colors of its neighboring pixels. Next, a conversion is performed upon the multiple component pixels from the color space of the image sensor to a color space that is more suitable for mathematical processing. For instance, although many image sensors provide pixels having red, green, and blue (RGB) color components, these RGB pixels are converted to the well known YUV color space prior to further processing for scaling. Scaling a YUV image is relatively easy from a mathematical point of view, involving the low pass filtering of the Y components of the pixels and then subsampling the Y components. Subsampling may be done, for instance, by selecting one Y component for every four pixels in a square, such that a 2:1 scaling ratio is achieved in both the horizontal and vertical directions of the image.

There are several disadvantages with the above-described conventional scaling approach. For instance, the conversion from pixels having a single component to pixels having multiple components greatly increases the amount of data that must be processed in the subsequent steps of the algorithm, as an image typically contains tens of thousands of pixels. Furthermore, multiple component pixels increase the storage requirements several fold over that required to store the original image having single component pixels. Moreover, the larger storage requirements may significantly increase memory access times if the converted image is too large for storage in cache memory. These factors substantially increase the time required for downscaling the image. This performance penalty becomes particularly important when a rapid series of images corresponding to motion video need to be transferred to the PC. Therefore, there is a need for an improved, more efficient technique for downscaling images which addresses some or all of the above-mentioned disadvantages.

SUMMARY

Accordingly, an embodiment of the invention is directed at a method of generating, based on an original image, a number of pixels characterizing a downscaled version of the original image, where each pixel comprises a number of components. The pixels of the downscaled version form at least three sets. The method operates by determining all of the components in each one of the first set of pixels, determining at least one of the components in each one of the second set of the pixels, and a third set having no components determined. The missing components are then determined by applying an interpolation methodology.

These as well as features and advantages of other embodiments of the invention will be apparent by referring to the written description, claims, and drawings below.

DETAILED DESCRIPTION

A method according to an embodiment of the invention operates to partially determine the scaled image, leaving missing components in the second and third sets of pixels. The partial determination may be done using linear mathematical operators that combine interpolation and low pass filtering and are applied to selected regions of the original image. For instance, to determine the components of a pixel in the first set, all of the operators are applied to the same two-dimensional pixel region of the original image to yield all of the components of the pixel in the first set. In a particular embodiment, combining the linear operations of interpolation and filtering into the same linear operator allows the method to downscale the original image using less storage space than the conventional multi-step technique described above in the Background section. Additionally, image transfer between the digital camera and the PC becomes more efficient when an incomplete scaled image, having fewer components than the complete scaled image, is being transferred. The missing components may then be determined by the PC. This shifts part of the task of downscaling to the PC, thus taking advantage of the greater storage and processing resources of the PC to reduce the burden on the imaging device.

Figure 1:
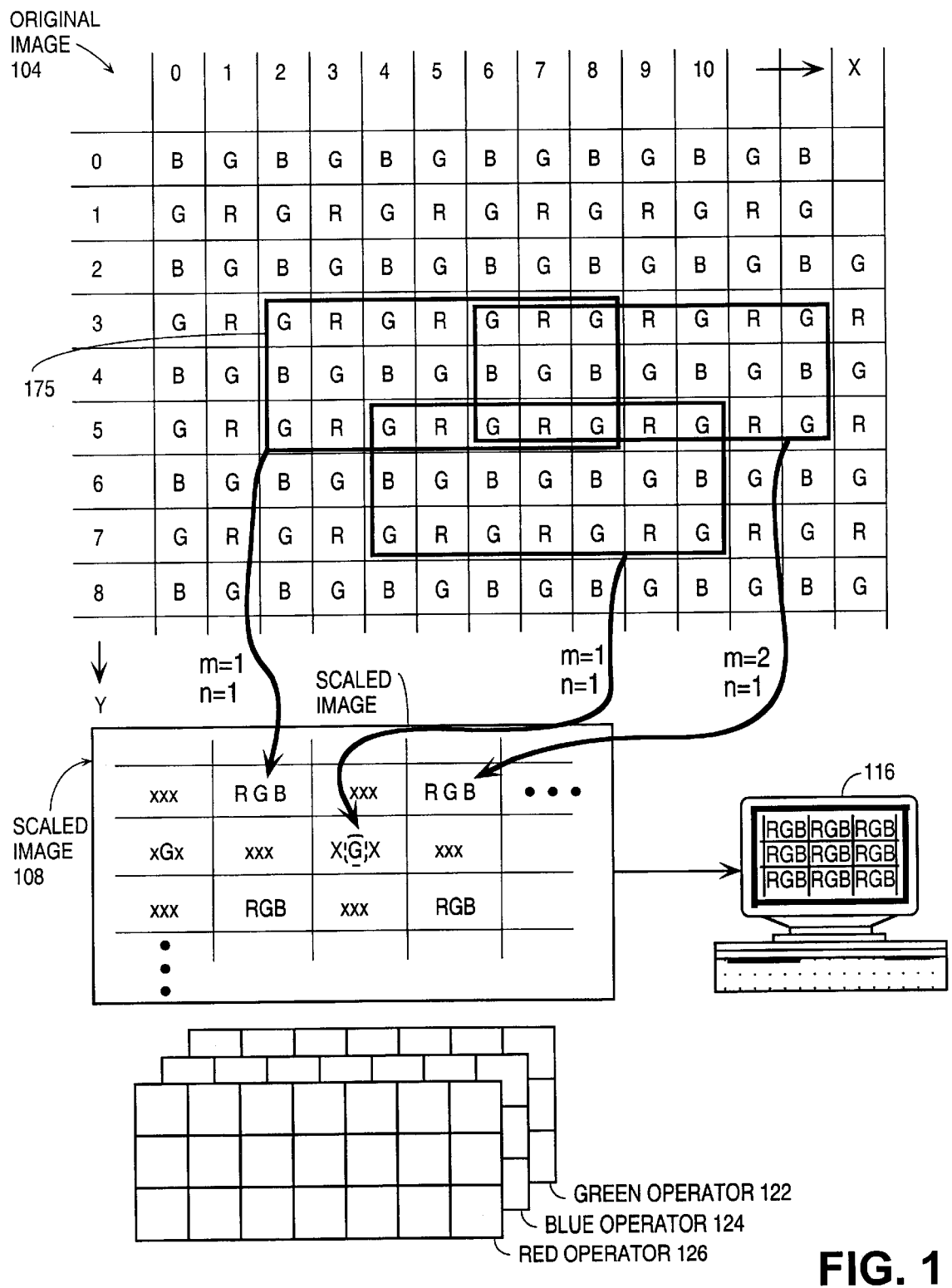
FIG. 1 illustrates a methodology according to an embodiment of the invention for downscaling an original image.

FIG. 1 shows how a scaled image 108 is formed based on an original image 104, according to an embodiment of the invention. The particular example in FIG. 1 operates upon the original image to produce a downscaled version which, when completed, will have pixels with three components each. The three components are a RED pixel value, a GREEN pixel value, and a BLUE pixel value. One of ordinary skill in the art will recognize that the following methodology will also apply to yield images having pixels with greater than or less than three components. In addition, the methodology may also be adapted to yield scaled images in a variety of color spaces other than RGB, including for instance Cyan, Magenta, and Yellow (CMY) and YUV.

The original image 104 comprises a number of pixels each having only a single component, in this case either an R, G, or B value. In contrast, the scaled image 108 in FIG. 1 comprises three sets of pixels. Pixels RGB in the first set have no missing components as all three R, G, and B components have been determined. The second set characterized by pixels xGx has, in this embodiment, two missing components which are R and B. Finally, all of the components of each pixel xxx in the third set are missing.

The first and second sets of pixels RGB and xGx are in alternate rows as shown in FIG. 1, while the third set of pixels xxx are in every row of the scaled image. The components in the first set of pixels and the G component in the second set of pixels are determined by applying one or more mathematical operators to portions of the original image. In this embodiment, there are three different mathematical operators 122, 124, and 126 corresponding to the three components. Each of the R, G, and B operators 122, 124, and 126 is used to compute its respective component value. To determine the RGB components of a pixel in the first set of the scaled image, the three operators are applied to the same selected two-dimensional pixel region. By way of example, two selected regions are shown corresponding to (m=1, n=1) and (m=2, n=1). Each operator takes as its input seven pixel values from the selected region in the original image, and in response provides an output component value. The mathematical details of the operators in a specific embodiment of the invention will be described below.

Figure 2:
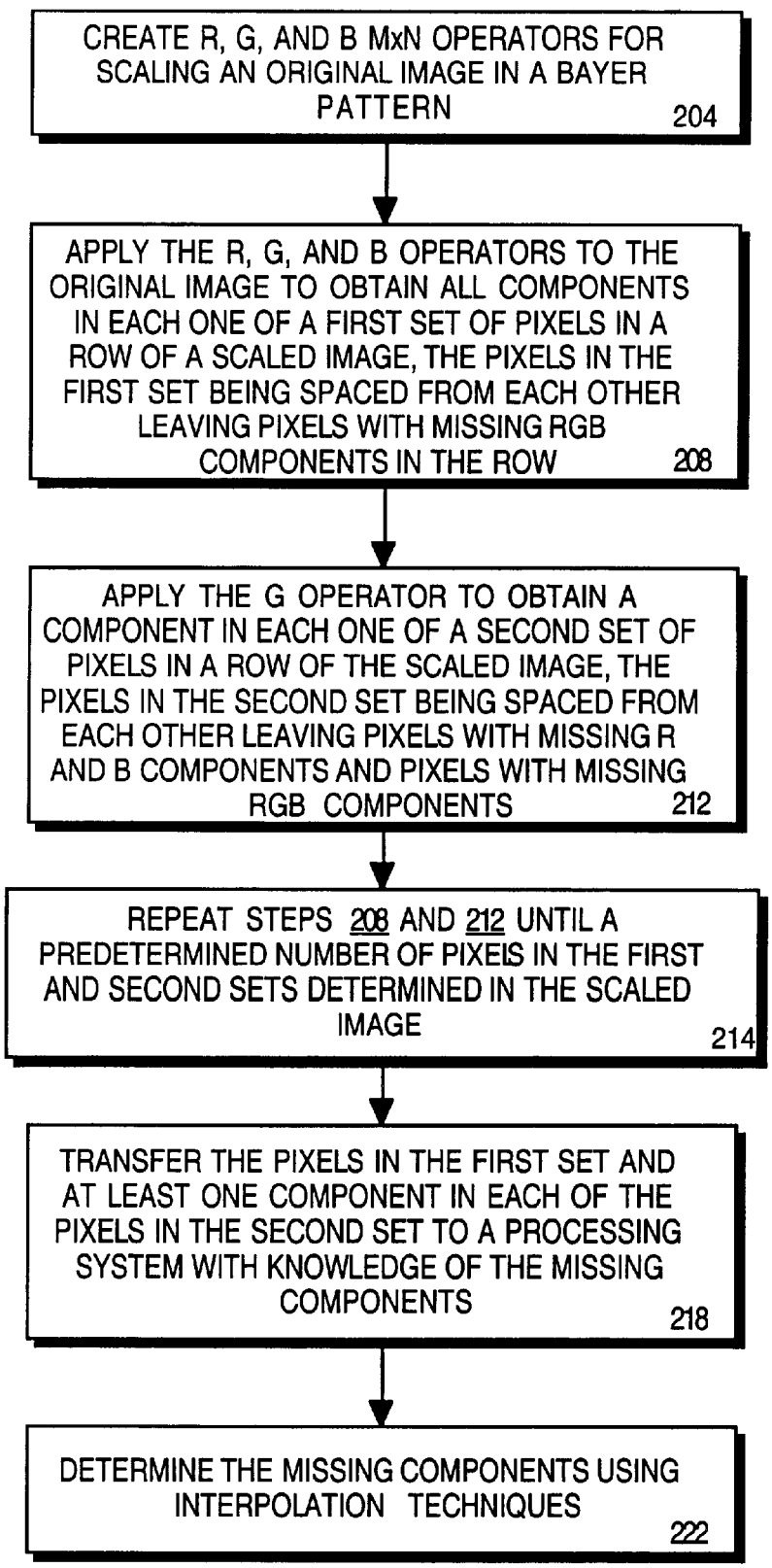
FIG. 2 is a flow diagram of the steps performed according to an embodiment of the invention in downscaling the original image.

Referring to FIGS. 1 and 2, FIG. 2 illustrates a flow diagram of the steps performed in determining the pixels of the scaled image 108, according to an embodiment of the invention. Operation begins with step 204 where the R, G, and B operators are determined based on the original image having a Bayer pattern (see FIG. 1). A specific technique for doing so will be described further below. Operation then proceeds with step 208 where each of the operators is applied to a first selected region of the original image to yield all components in the pixel (m=1, n=1). The same operators are then applied to a second selected region in order to yield the components of the pixel (m=2, n=1). The operators thus move horizontally along the original image 104 as m increases, until a predetermined number of pixels RGB in the first set of the scaled image 108 have been computed.

Operation then proceeds with step 212 where at least one of the operators, in this case only the G operator, is applied to selected regions in the original image 104 to obtain at least one component, in this case only the G component, of pixels xGx in the second set of the scaled image 108. The G operator is shifted horizontally across the original image 104 to successively compute the G components of the pixels xGx in the scaled image 108. Note that the pixels RGB of the first set as well as the pixels xGx of the second set in the scaled image 108 are spaced from each other, in this case by only a single pixel xxx. Steps 208 and 212 are repeated until either the entire original image 104 has been treated, or a predetermined number of pixels of the first and second set have been computed for the scaled image 108. At this point, the scaled image 108 is incomplete due to the missing components "x". These missing components, however, may now be readily computed using conventional interpolation techniques as will be apparent to those of ordinary skill in the art, as indicated in step 222.

Referring to FIG. 1 in the particular system application of an imaging device such as a digital camera coupled to a processing system such as a PC, the incomplete scaled image 108 may be transferred from the digital camera to a PC 116 for determining the missing components. Specifically, only the first set of pixels RGB and at least one component in each of the second set of pixels xGx are transferred to the processing system. Knowledge of the location of the missing components x may also be transferred to the PC 116, either simultaneously with the pixels of the first and second sets or at a different time. Transferring only the first set of pixels and one component in each of the second set of pixels allows the imaging device to transfer images at a faster rate when compared to transferring a scaled image in which every component in each pixel has been determined before the transfer. The methodology not only reduces the storage and bandwidth required for transfer of image data between the imaging device and the processing system, it also reduces the processing power required in the imaging device. These advantages are particularly beneficial when the imaging device is generating a large number of original images at a high rate, such as in a video sequence, to be displayed by the PC 116. The lower processing and storage requirements also translate to lower overall costs when mass manufacturing the imaging device. Furthermore, the particular combination of determining all components in the first set of pixels RGB and only the G component in the second set of pixels xGx as shown in FIG. 1 results in a completed scaled image 108 which has good contrast and sharpness, even when using only standard interpolation techniques to determine the completed scaled image.

Turning now to the details of the operators 122, 124, and 126, these operators may be linear mathematical operators that combine conventional interpolation and filtering methodologies. Each operator may be represented by a two-dimensional array of coefficients that are determined based on the particular interpolation and filtering methodology selected and based on the image scaling ratio. In a particular embodiment, each operator is applied to regions of the original image having pixels positioned in the following pattern, taken from a conventional Bayer pattern:

| G(1) | R(2) | G(3) | R(4) | G(5) | R(6) | G(7) |
| B(8) | G(9) | B(10) | G(11) | B(12) | G(13) | B(14) |
| G(15) | R(16) | G(17) | R(18) | G(19) | R(20) | G(21) |

The 21 coefficients of each operator represent one or more linear image processing operations such as interpolation and filtering that have been combined into a summation formula. The multiple operations are thus combined into a single mathematical step of applying each operator to a selected region in the original image to generate a component of a target pixel in the scaled image. Each coefficient of an operator is multiplied by its corresponding pixel value in the selected region. The products are then summed or averaged to yield a component of the target pixel in the scaled image 108. Three different operators are normally created, one for each component of the target pixel. The operators may be used to compute all of the desired components in the incomplete scaled image 108. Although an operator having a 3×7 array of coefficients has yielded satisfactory results, the operator may take on a larger or smaller size. In addition, the array need not have an odd number of coefficients on each side although using an odd number is more convenient from a computation standpoint.

FIG. 1 illustrates three different sampling points in the original image, their respective m and n index numbers, and the resulting two pixels RGB and one G component in pixels xGx in the scaled image. The sampling point, i.e. the location on the selected region in the original image 104 where the operator is centered for computing its component, depends primarily on the scaling ratio. For instance, taking a pixel in the upper left corner of the original image 104 to be at (0,0), the sampling point of the selected region on 175 having an odd number of rows and an odd number of columns is at the center of the selected region. Thus, a formula for the coordinates of the sampling point may be written as:

x=1+2*m*(number of columns in the original image)/(number of columns in the scaled image), and y=2*n*(number of rows in the original image)/(number of rows in the scaled image)

where m and n are integers that are incremented by 1 for computing each successive target pixel RGB or xGx in the scaled image. Similarly, a formula for the coordinates of the sampling point at which the single G component of the pixel xGx in the scaled image 108 is computed may be given by:

x=3+2*m*(number of columns in the original image)/(number of columns in the scaled image) and y=2+2*n*(number of rows in the original image)/(number of rows in the scaled image).

This particular formula works well for an original image having a resolution that is twice that of the scaled image for the case in which the scaled image has a spacing of 1 pixel between adjacent RGB/xGx pixels in the same row. If the resolution of the original image were sufficiently high, then the spacing between adjacent RGB/xGx pixels in the scaled image could accordingly be increased and still yield acceptable results. This would require a different set of formulas than those described herein, but ones which can be readily developed by those of ordinary skill in the art based on the teachings herein.

To determine the coefficients in each operator, the contributions from each of the linear operations to the coefficients are first determined separately. One such linear operation may be interpolation. First, standard interpolation is used to determine the G component of each pixel in a selected region of the original image 104. This may yield:

$$G'(j) = \sum_{i=1}^{21} cg(i, j) * G(i) \quad (1)$$

where cg(i,j) represents the unknown contribution to the pixel in position j by the pixel in position i, where i and j take the values 1–21 (for this example) as shown above in the selected region of the Bayer pattern in the original image 104. The G(i) is the known green pixel value at location i. G(j) is the interpolated green component at location j in the selected region of the original image 104.

Different interpolation techniques may be applied to generate the cg(i,j)in equation 1. A simple and effective technique is to assume that no interpolation is necessary for locations where a green pixel is already provided in the original image 104. In addition, such a technique also assumes that the cg(i,j) are normalized to one, i.e., $$\sum_{i=1}^{21} cg(i, j) = 1 \quad (2)$$

for a given interpolated green pixel at location j. The cg(i,j) are thus fractions which can be readily determined by one of ordinary skill in the art.

Once the linear interpolation coefficients cg(i,j) have been determined, the next step is to determine the filtering that will be applied to the selected region to generate the G component of the target pixel in the scaled image 108. This G component may be given by $$G'' = \sum_{j=1}^{21} G'(j) * h(j) \quad (3)$$

Expanding the summation in equation (3) using equation (1) and collecting terms gives $$G'' = \sum_{i=1}^{21} G(i) * cgh(i) \quad (4)$$

where cgh(i) is given by $$cgh(i) = \sum_{j=1}^{21} cg(i, j) * h(j) \quad (5)$$

Using the assumption that only the green pixels in the selected region of the original image 104 will contribute to the G component of a target pixel in the scaled image 108, i.e., the contribution from red and blue pixels in the selected region to the target green component is zero, the following results may be obtained:

$$G'' = G(1) * \{cg(1, 1) * h(1) + cg(1, 2) * h(2) + cg(1, 8) * h(8)\} + \quad (6)$$

$$G(3) * \{cg(3, 2) * h(2) + cg(3, 3)h(3) * cg(3, 4) * h(4) +$$

$$cg(3, 10) * h(10)\} +$$

$$G(5) * \{cg(5, 4) * h(4) + cg(5, 6) * h(6) + cg(5, 12) * h(12)\}$$

$$G(7) * \{cg(7, 7) * h(7) + cg(7, 6) * h(6) + cg(7, 14) * h(14)\} +$$

$$G(9) * \begin{Bmatrix} cg(9, 2) * h(2) + cg(9, 10) * h(10) + cg(9, 16) * h(16) \\ cg(9, 8) * h(8) + g(9, 9) * h(9) \end{Bmatrix}$$

$$\vdots$$

$$G(21) * \{cg(21, 20) * h(20) + cg(21, 14) * h(14) +$$

$$cg(21, 21) * h(21)\}$$

The quantities within brackets that are multiplied by a green pixel from the selected region of the original image 104 are the coefficients of the green operator 122. Equation (6) thus represents the application of the green operator 122 to a selected region in the original image 104.

The remaining step in determining the green operator 122 is to determine the values for the filter coefficients h(j). Any one of a number of different filters can be used for h(j), but the well known Hamming filter works particularly well and is relatively simple to implement from a computational standpoint. To determine h(j) according to an embodiment of the invention, the pixels in the selected region are deemed to lie in an x-y plane with pixel 11, (G(11)) for the example here, being the center having coordinates (x=0,y=0). Pixel 1 (G(1)) will thus have coordinates (−3,1). The location of the target pixel is at (xoffset, yoffset). Given these assumptions, the following set of equations may be used to compute h(j) for a 3×7 operator:

n=operator_length=7 fc=final dimension/original dimension (for example, when scaling down by a factor of 2, fc=½)

m=(n−1)/2 xc=(x−xoffset−m)

yc=(y−yoffset−m)

r(j)=sqrt(xc*xc+yc*yc)

w(j)=0.54−0.46*cos(π*(r+m)/m)

d(j)=sin(fc*π*r)/(π*r)

h(j)=w(j)*d(j)

The cutoff frequency of the filtering should be determined so that any aliasing effects in the scaled image 108 are insignificant, without rendering the scaled image 108 too smooth or blurred. For instance, if the filter passband is too narrow, then aliasing may occur. On the other hand, if the passband is too broad, then there may be too much of a smoothing effect in the scaled image 108. For further information on filters, the reader is referred to the text, Introduction to Signal Processing, S. J. Orfanidis, Prentice Hall, 1996.

A wide range of well known digital signal processing filters may be used, in particular one that combines the Hamming filter and the sinc function, or one that features the Kaiser filter. The origin of the filter function is normally positioned at the center pixel of the selected region. The distance between the origin and each of the other positions in the selected region can be easily computed by those of ordinary skill in the art. Thereafter, the values of h(j) are computed using their distances from the origin. Experiments have shown that the scaled image 108, once complete, is visually satisfying if a low pass filter having a relatively sharp drop beyond the cutoff frequency is used.

Once the h(j) have been determined, then the coefficients cgh(i,j) for the green operator 122 may be determined using equations (5) and (6).

The red and blue operators 126 and 124 are normally determined using a different technique than the technique described for the green operator. One way to determine the red operator is to first determine all of the interpolated green components in the selected region of the original image, and then use these to produce a correction term that will be applied to the known red and green pixels in the selected region to obtain interpolated red components in the selected region. The contribution to the interpolated red components by the blue pixels of the selected region may be assumed to be zero. Thus, the interpolated red components in the selected region may be given by:

$$R'(j) = \sum_{i=1}^{21} a_j R(i) + G(j) + \sum_{i=1}^{21} a_i G(i) \qquad (7)$$

After determining the interpolated red components R'(j), the target red component in the scaled image may be determined as follows:

$$R'' = \sum_{j=1}^{21} R'(j) * h(j) \qquad (8)$$

where R'(j) is given by equation (7).

Once again, after collecting terms in R(i) and G(i) (which are pixels in the original image), a formula for the target red component may be written as follows:

$$R'' = R(2)*a_2*h(2) + R(4)*a_4*h(4) + R(6)*a_6*h(6) + \qquad (9)$$
$$R(18)*a_{18}*h(18) + R(20)*A_{20}*H(20) + G(11)*h_{11} -$$
$$\{G(3)*a_3*h(3) + G(5)*a_5*h(5) + G(17)*a_{17}*h(17) +$$
$$G(19)*a_{19}*h(19)\}$$

The coefficients within brackets in the above equation (9) are the coefficients of the red operator 126. Equation (9) thus represents the application of the red operator 124 to the selected region in the original image 104. The filter values h(j) may be computed in the same way as was done for the green operator 122 above.

Determining the blue operator 124 may be as follows. Note that in this particular embodiment of the invention, the only blue components to be interpolated in the selected region are normally those in the middle row of the selected region. In other words, all values of B'(j) are zero except for j=9, 11, and 13. The interpolated blue components are thus given by:

$$B'(j) = \sum_{i=1}^{21} a_i * B(i) + G(j) + \sum_{i=1}^{21} a_i * G(i) \qquad (10)$$

The target blue component in the scaled image may be given by:

$$B'' = \sum_{j=1}^{21} B'(j) * h(j) \qquad (11)$$

with B'(j) given by equation (10). Once again, after collecting terms in R(i), B(i), and G(i), a formula for the target blue component may be written as follows:

$$B' = B(8)*a(8)*h(8) + B(10)*a(10)*h(10) + B(12)*a(12)* \qquad (12)$$
$$h(12) + B(14)*a(14)*h(14) + G(11)*h(11) - \{G(3)*$$
$$a(3)*h(3) + G(5)*a(5)*h(5) + G(17)*a(17)*h(17) +$$
$$G(19)*a(19)*h(19)\}$$

The filter values h(j) are computed in the same way as for the green and red operators above.

To summarize, FIG. 1 shows the case in which the original image 104 is scaled by one half (2:1) to produce the downscaled image 108. Each pixel value in the scaled image is produced by a linear combination of pixel values within a selected region in the original image 104. One of the factors used to produce the linear combination has the functional form f(x-xoffset, y-yoffset). The effective center of this function is (xoffset, yoffset) where the function has a peak at f(0,0) where x equals xoffset and y equals yoffset. A different pair of xoffset and yoffset values is used for each scaled pixel. For example, xoffset equals 5 and yoffset equals 4 for the selected region used to produce values for the RGB pixel in the upper left of the scaled image. Generally, for a scale ratio 2:1, the selected region used to produce scaled pixel values will be centered on a pixel in the original image, so the values of xoffset and yoffset will be integers. However, for many other scaling ratios, xoffset and yoffset will not be integers.

The example above focused on scaling an original RGB image into a smaller size RGB image. In some cases, however, a transformation in the fundamental color space is also desirable when scaling an image. For instance, one commonly used transformation is from RGB to YUV, where the YUV format is often used for more efficient still and video calculations. The algorithm transformation from RGB to YUV is linear and therefore may be combined with the RGB interpolation and filtering methodologies described above, based on:

$$Y = A_{ry}*R + A_{gy}*G + A_{by}*B$$

$$U = A_{ru}*R + A_{gu}*G + A_{bu}*B$$

$$V = A_{rv}*R + A_{bv}*G + A_{bv}*B$$

The operators for the Y, U, and V components of a target pixel in the scaled image are then:

$$\begin{aligned} Y &= A_{ry}*C_r*D + \\ & A_{gy}*C_g*D + \\ & A_{by}*C_b*D \\ U &= A_{ru}*C_r*D \\ & A_{gu}*C_g*D \\ & A_{bu}*C_b*D \\ V &= A_{rv}*C_r*D \\ & A_{gv}*C_g*D \\ & A_{bv}*C_b*D \end{aligned}$$

where each of the nine $A_{ry}, A_{gy}, \ldots A_{bv}$ is a scalar value determined using well known color space transformation techniques, Cx is a N×N matrix having elements C(i,j) where N is the number of coefficients in the operator (e.g., 21 for a 3×7 array), and D is a vector of length N and having elements being pixel values of the selected region in the original image 104.

Figure 3:
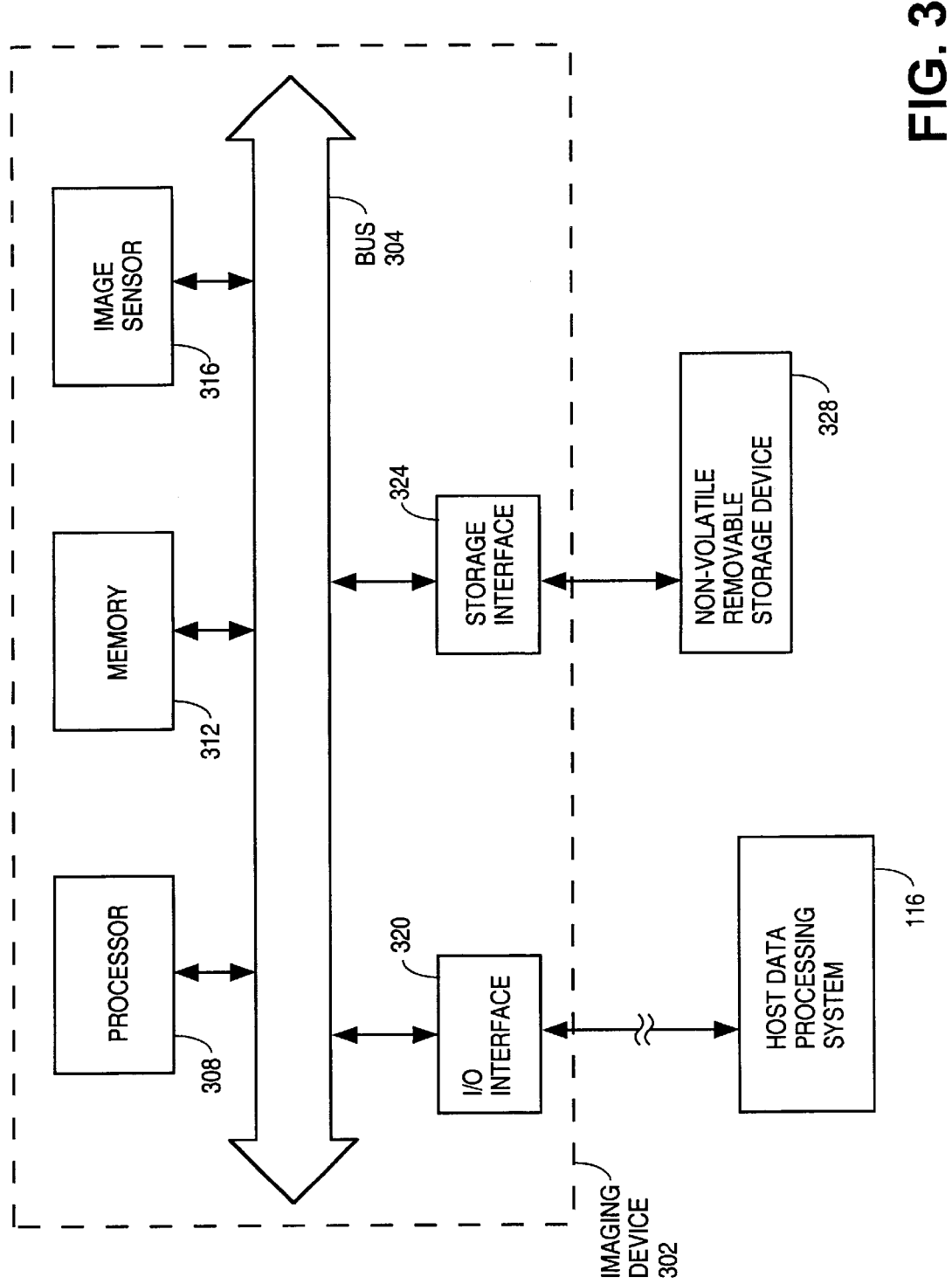
FIG. 3 shows an imaging system application as another embodiment of the invention.

FIG. 3 illustrates a block diagram of an embodiment of the invention as an imaging system. The imaging system comprises an imaging device 302 communicatively coupled to a host data processing system 116. In a particular embodiment, the imaging device 302 is a digital camera while the host data processing system 116 is a personal computer. Of course, other combinations of imaging device and host processing systems may be configured with the functionalities described above. In the embodiment shown in FIG. 3, the imaging device 302 comprises an image sensor 316 that generates the original image. The sensor 316 may include an integrated circuit complementary metal oxide semiconductor (CMOS) active pixel sensor (APS) to capture the scene electronically. Alternatively, the original image may be generated by a charge coupled device (CCD) based image sensor. In general, a wide range of image sensors can be used to generate the original image. The image sensor 316 is connected to a bus 304, which may be a standard computer bus or a specialized bus for embedded applications. The digital pixel values can be accessed by a processor 308 and may be temporarily stored in a memory 312. The memory 312 may also be used to store instructions which when executed by the processor 308 cause the imaging device 302 to generate a number of pixels characterizing a downscaled version of the original image according to the techniques above. The downscaled version may then be stored in a non-volatile removable storage device 328 which is coupled to the bus 304 via a storage interface 324. In certain embodiments, the removable storage device 328 may comprise a removable memory card. An alternative technique for transferring the downscaled version outside the imaging device 302 is to use a conventional I/O interface 320 configured to operate according to any suitable one of a number of computer peripheral bus standards, including the Universal Serial Bus (USB) and a high speed serial bus. In any case, only the pixels that characterize the incomplete downscaled version of the original image are transferred, and the missing components are then determined by the host data processing system 116 according to a conventional interpolation methodology. In a particular embodiment, the host data processing system 116 will operate based on a machine-readable medium having instructions which when executed by a processor cause the data processing system to receive the pixels characterizing the incomplete downscaled version of the original image from the imaging device, and then determine the missing components of the pixels using an interpolation methodology. As an alternative to a programmed processor performing the various functions described above in the different embodiments of the invention, a wide range of hard wired and/or programmable logic circuitry may also be configured to perform the different functions, including those of generating the pixels that characterize the downscaled version of the original image by applying mathematical operators to the original image.

In the foregoing specification, the invention has been described with reference to specific embodiments. It will, however, be evident that various modifications and changes can be made thereto without departing from the broader spirit and scope of the invention as set forth in the appended claims. For instance, the imaging device, rather than the PC, may be configured to fully determine the complete scaled image, including the missing components, using the above methodologies, to take advantage of the reduced computation and storage resources allowed by the methodology. Also, although several embodiments of the invention have been described above in the framework of an imaging device such as a digital camera connected to a PC, this is done merely to better illustrate some of the advantages of the invention. Other types of imaging systems may also benefit from the various embodiments described, such as video cameras, video conferencing cameras, digital photography kiosks, color copiers, and scanners. It is intended that all such modifications and applications be within the scope of the appended claims.

What is claimed is:

1. A method comprising:
   generating based on an original image a plurality of pixels characterizing a downscaled version of the original image, each pixel includes a number of components, by determining all of the components in each one of a first set of said pixels, determining at least one of the components in each one of a second set of said pixels, and a third set of said pixels having no components determined, said second and third sets having missing components; and determining the missing components of the second and third sets by applying an interpolation methodology.

2. The method of claim 1 further comprising transferring the first set of pixels and the component in each one of the second set of pixels from an imaging device to a separate data processing system before performing the step of determining the missing components by the data processing system.

3. The method of claim 1 wherein the step of generating the plurality of pixels comprises determining the components of the first and second sets of pixels by applying one or more mathematical operators, each being a linear combination of interpolation and filtering, to regions of the original image.

4. The method of claim 3 wherein the number of mathematical operators correspond to the number of components, the operators being applied to the same region of the original image when determining the components of one of the first set of pixels.

5. The method of claim 3 wherein the filtering comprises applying a Hamming filter.

6. The method of claim 3 wherein the original image comprises a plurality of pixels each having a single component of one of a number of base types, and
wherein each of the regions is a two-dimensional pixel region having components of all of the base types.

7. The method of claim 1 wherein the first and second sets of pixels are in alternate rows and the third set of pixels are in every row of the downscaled version.

8. The method of claim 1 wherein said number of components is three, a first component being a red pixel value, a second component being a blue pixel value, and a third component being a green pixel value.

9. The method of claim 8 wherein the step of determining at least one of the components in each one of the second set of said pixels comprises determining only the green pixel value in each one of the second set.

10. An imaging device comprising:
an image sensor for generating an original image;
a processor; and
a memory having instructions which when executed by the processor cause the imaging device to:
generate a plurality of pixels characterizing a downscaled version of the original image, each pixel comprising a number of components, by determining all of the components in each one of a first set of said pixels, determining at least one of the components in each one of a second set of said pixels, and a third set of said pixels having no components determined, said second and third sets having missing components, and
transfer the plurality of pixels to a data processing system for determining the missing components of the second and third sets.

11. The imaging device of claim 10 wherein the memory further includes instructions which when executed by the processor cause the imaging device to determine the components of the first and second sets of pixels by applying one or more mathematical operators each being a linear combination of interpolation and filtering, to regions of the original image.

12. The imaging device of claim 11 wherein the filtering comprises applying a Hamming filter.

13. The imaging device of claim 11 wherein the original image comprises a plurality of original pixels each having a single component of one of a number of base types, and
wherein each of the regions is a two-dimensional pixel region having components of all of the base types.

14. The imaging device of claim 10 where the number of mathematical operators correspond to the number of components, the operators being applied to the same region of the original image when determining the components of one of the first set of pixels.

15. The imaging device of claim 10 wherein the first and second sets of pixels are in alternate rows and the third set of pixels are in every row of the downscaled version.

16. An article of manufacture comprising
a machine-readable medium having instructions which when executed by a processor cause a data processing system to
receive a plurality of received pixels characterizing a downscaled version of an original image obtained by an imaging device, each received pixel comprising a number of components, all of the components in each one of a first set of said received pixels having been determined, at least one of the components in each one of a second set of said received pixels having been determined, and none of the components of a third set of said pixels having been determined, said second and third sets having missing components; and
determining the missing components of the second and third sets using an interpolation methodology.

17. The article of claim 16 wherein the first and second sets of pixels are in alternate rows and the third set of pixels are in every row of the downscaled version.

18. The article of manufacture of claim 16 wherein the original image comprises a plurality of original pixels each having a single component of one of a number of base types, and wherein each of the regions is a two-dimensional pixel region having components of all of the base types.

19. The article of manufacture of claim 16 wherein said number of components is three, a first component being a red pixel value, a second component being a blue pixel value, and a third component being a green pixel value.

20. The article of manufacturing of claim 19 wherein only the green pixel value in each one of the second set of said pixels is determined when determining the missing components of the second set.

21. An apparatus comprising:
means for generating an original image; and
means for generating a plurality of pixels characterizing a downscaled version of the original image, by determining all of the components in each one of a first set of said pixels, determining at least one of the components in each one of a second set of said pixels, and a third set of said pixels having no components determined, said second and third sets having missing components.

22. The apparatus of claim 21 further comprising:
means for applying one or more mathematical operators, each being a linear combination of interpolation and filtering, to regions of the original image.

23. The apparatus of claim 22 wherein the original image comprises a plurality of original pixels each having a single component of one of a number of base types, and
wherein each of the regions is a two-dimensional pixel region having components of all of the base types.

24. The apparatus of claim 22 wherein the original image has a Bayer pattern of pixels.

25. The apparatus of claim 22 wherein said mathematical operators further include color conversion to obtain the downscaled version of the original image in a different color space than the original image.

* * * * *